Jan. 8, 1924.
H. F. STRATTON
METHOD OF MAKING STATORS
Filed July 26, 1922
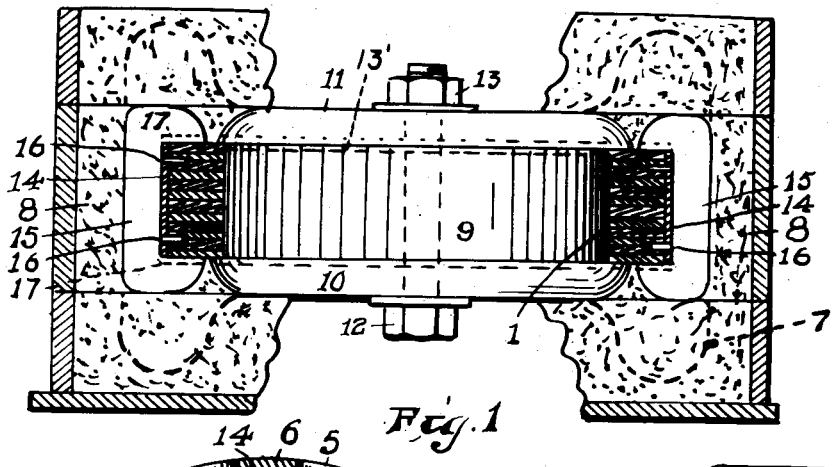
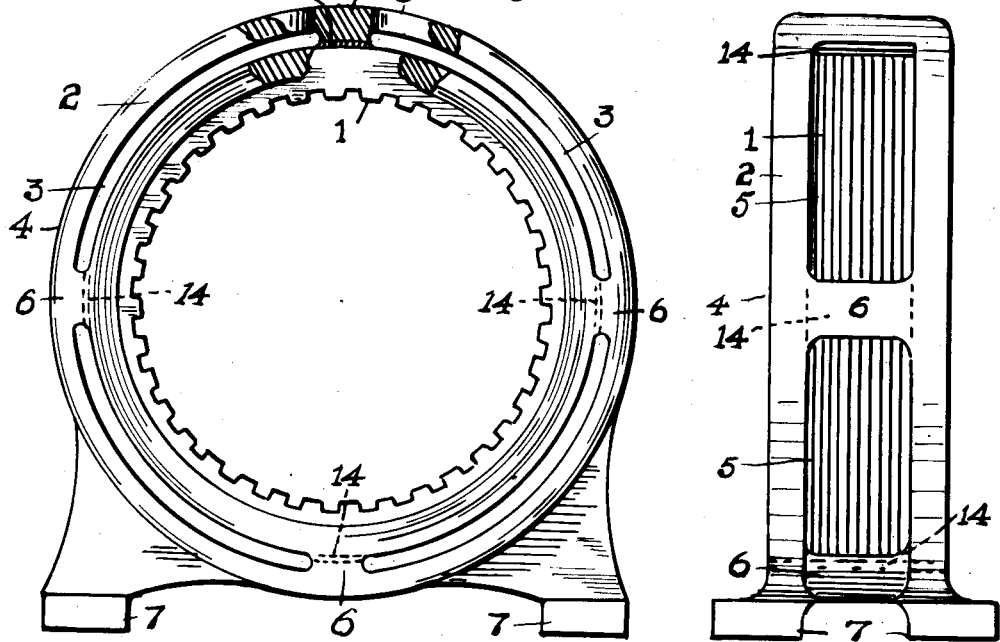
INVENTOR.
H. F. Stratton
BY F. N. Barber
ATTORNEY.

Patented Jan. 8, 1924.

1,480,312

UNITED STATES PATENT OFFICE.

HARRY F. STRATTON, OF CLEVELAND HEIGHTS, OHIO, ASSIGNOR TO THE ELECTRIC CONTROLLER & MANUFACTURING COMPANY, OF CLEVELAND, OHIO, A CORPORATION OF OHIO.

METHOD OF MAKING STATORS.

Application filed July 26, 1922. Serial No. 577,702.

*To all whom it may concern:*

Be it known that I, HARRY F. STRATTON, a citizen of the United States, residing at Cleveland Heights, in the county of Cuyahoga and State of Ohio, have invented new and useful Improvements in Methods of Making Stators, of which the following is a specification.

My invention relates to the manufacture of stators for induction motors. Unless special precautions are taken, stator frames cast in contact with the periphery and sides of the stator laminations are liable during cooling to break both transversely of, and in parallel with, the laminations. It is the object of this invention to avoid the liability of the stator frame to break upon cooling in either of said directions or both.

Referring to the accompanying drawings, Fig. 1 is a cross-section of a portion of a mold ready for casting a stator frame therein, the mandrel and clamping means for the laminations being shown in plan view; Fig. 2, a side view of a completed stator, a part being broken away; and Fig. 3, a view of a stator, taken at right angles to Fig. 2.

In Figs 2 and 3 I show a stator comprising the annular laminations 1 and the frame 2 cast around the periphery and sides of the assembled laminations. The degree to which the frame may cover or conceal the laminations is immaterial to this invention, but I prefer to provide it with the open spaces 3 in the side members 4 of the frame and with the open spaces 5 in the circumferential portions of the frame, the cross-bars or members 6 connecting the side members 4 together. The ends of the members 6 form the ends of the slots 3 and the sides thereof between the members 4 form the ends of the slots 5. The inner portion of the side members 4, that is, the portion within the inner walls of the slots 3, overlap, or are cast against, the sides or terminal members of the assembly of laminations 1. In my application Serial Number 502,254, filed September 21, 1921, I show the members 6 cast in contact with the laminations and, in order to prevent the fracture of the frame transversely of the laminations, I provided a transverse slot entirely across the bottom of the frame between the stator feet 7.

In my said application I set forth the method herein disclosed for preventing the fracture of the frame parallel with the laminations.

In the present application, I place in the mold prior to the casting operation pieces of yieldable material at selected positions in those parts of the molding spaces which are to be filled with metal to form the bars or members 6, so that, when the metal shrinks during cooling, it will more or less compress or displace the said pieces of yieldable material and materially reduce the breaking strains tending to fracture the frame transversely of the laminations.

On Fig. 1 I show portions 8 of a mold in which the assembled laminations 1 and their clamping means form the core. The annular laminations 1 are assembled on a mandrel, whose cylindrical body 9 fits the openings therein. The mandrel has the head or flange 10 which may be integral therewith, the head fitting or resting against one end of the assembled laminations near the central opening therein. A cap or second head member 11 is placed opposite the remaining end of the body 9 and overlaps the remaining end of the laminated assembly. A bolt 12 is passed through the body 9 and the heads 10 and 11, the nut 13 on the bolt being turned so as to bring the heads 10 and 11 toward each other and thereby clamp the laminations preferably as tightly as possible by a hand wrench. The nut is then loosened or backed off to such a degree that the frame, during its shrinking after the casting operation, may compress the laminations sufficiently to prevent the casting from breaking parallel with the laminations. No rule can be formulated as to the precise degrees of tightening and loosening the clamping means, as these will vary with the thickness of the individual laminations, of their combined thickness, and of the walls of the casting, and also with the composition and heat treatment of the laminations and the composition of frame. It has been found advantageous first to tighten the clamping nut as described and then to release the clamping force by backing the nut off a number of turns or degrees for the following reason. The nut can be turned down practically to a uniform degree of tightness when it is turned down as tightly as possible by a hand wrench. All looseness or slack can thus be taken up, thus permitting a predetermined degree of looseness to be obtained simply by backing off the nut a definite number of turns or degrees. It would be difficult, if not impracticable, to merely turn down the nut, because the operator could not know with any exactness what degree of looseness had been obtained.

In Fig. 1, the dotted line 13' indicates the position of the cap 11 when the nut was tightened, and the full-line position of the cap is that taken by it when the nut was loosened.

In the present case I have obviated the necessity of providing a transverse slot across the stator frame, by placing yielding material 14 in the spaces between the periphery of the laminations and those portions of the mold radially beyond, that is, in the portions 15 of the mold space which are to be occupied by the cross-bars 6. The material 14 may be held in place by any suitable means, as by the pins 16 which are passed through the material 14 and into the assembled laminations.

The yieldable material may be composed of asbestos having the desired degree of compressibilty, or it may be a metal, such as an alloy fusible by the heat from the metal cast in the mold. The alloy will prevent contact of the cast metal with the laminations for a time at least, thereby giving the metal time to partially solidify before the alloy becomes liquid. The shrinking of the casting will cause more or less of the alloy to be squeezed out, thereby relieving the casting of strains liable to break it transversely. No definite rule can be given for the composition or thickness of the alloy strips, as they will vary with the size, thickness and composition of the stator frame. Yielding material of widely different composition and structure may be used in place of those proposed herein, which are cited merely as suggestions.

Rings of yieldable material might be placed against those parts of the sides of the core which are exposed in the mold space. These rings shown in dotted lines 17 obviate the releasing of the clamping means, hereinbefore described.

I claim—

1. The method of making stators for induction motors with frames cast around the laminations which consists in forming a core containing an assembly of laminations, forming a mold with a molding space for the frame around the periphery of the core and adjacent portions of the sides thereof, and pouring molten metal into the molding space, yieldable material having been previously disposed in those parts of the molding space where the cast metal upon shrinking will transmit strains radially toward the periphery of the core.

2. The method of making stators for induction motors with frames cast around the laminations which consists in forming a core containing an assembly of laminations, forming a mold with a molding space for the frame around the periphery of the core and adjacent portions of the sides thereof, and pouring molten metal into the molding space, yieldable material having been previously disposed in the molding space to receive strains due to the shrinking of the cast metal toward the core.

3. The method of making stators for induction motors with frames cast around the laminations which consists in forming a core containing an assembly of laminations, forming a mold with a molding space for the frame around the periphery of the core and adjacent portions of the sides thereof, and pouring molten metal into the molding space, yieldable material having been previously placed on the core to receive strains due to the shrinking of the casting.

4. The method of making stators for induction motors with frames cast around the laminations which consists in forming a core containing an assembly of laminations, forming a mold with a molding space for the frame around the periphery of the core and adjacent portions of the sides thereof, and pouring molten metal into the molding space, yieldable material having been previously placed on the periphery of the core to receive strains due to the radial shrinking of the casting.

5. The method of making stators for induction motors with frames cast around the laminations which consists in assembling a group of annular laminations, tightly clamping them together, releasing them to a predetermined degree, and casting about them a frame embracing the periphery and adjacent sides of the group of laminations.

Signed at Cleveland, Ohio, this 20th day of July, 1922.

HARRY F. STRATTON.